(12) United States Patent
Liu et al.

(10) Patent No.: US 12,045,600 B2
(45) Date of Patent: Jul. 23, 2024

(54) METHOD FOR UPGRADING IoT TERMINAL DEVICE AND ELECTRONIC DEVICE THEREOF

(71) Applicant: BOE Technology Group Co., Ltd., Beijing (CN)

(72) Inventors: Cheng Liu, Beijing (CN); Hongtao Guan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 345 days.

(21) Appl. No.: 17/488,155

(22) Filed: Sep. 28, 2021

(65) Prior Publication Data
US 2022/0100493 A1   Mar. 31, 2022

(30) Foreign Application Priority Data
Sep. 30, 2020   (CN) .......................... 202011060564.6

(51) Int. Cl.
*G06F 8/65*   (2018.01)
*H04L 9/40*   (2022.01)

(52) U.S. Cl.
CPC ............ *G06F 8/65* (2013.01); *H04L 63/0428* (2013.01); *H04L 63/0869* (2013.01); *H04L 63/0876* (2013.01)

(58) Field of Classification Search
CPC ...... H04L 67/34; H04L 2209/84; B60L 58/12; G06F 8/65; G06F 16/23; G06F 21/305; G06F 8/61
See application file for complete search history.

(56) References Cited

U.S. PATENT DOCUMENTS

| 2009/0158397 | A1* | 6/2009 | Herzog ................. H04L 67/303 726/4 |
| 2013/0262858 | A1 | 10/2013 | Neuman et al. |
| 2018/0349129 | A1* | 12/2018 | Ju ............................ G06F 8/654 |
| 2019/0036781 | A1* | 1/2019 | Prabhu .................. H04L 41/082 |
| 2019/0220265 | A1* | 7/2019 | Willis .................... H04W 76/10 |
| 2019/0325666 | A1* | 10/2019 | Teraoka ............... G07C 5/0808 |
| 2019/0354685 | A1* | 11/2019 | Tomasso ............... G06F 21/554 |

(Continued)

FOREIGN PATENT DOCUMENTS

| CN | 105208132 A | 12/2015 |
| CN | 107579863 A | 1/2018 |

(Continued)

OTHER PUBLICATIONS

CN202011060564.6 first office action.

*Primary Examiner* — S. Sough
*Assistant Examiner* — Cheneca Smith
(74) *Attorney, Agent, or Firm* — IPro, PLLC

(57) ABSTRACT

The present disclosure provides a method for upgrading an Internet of Things (IoT) terminal device and an electronic device thereof. The method includes: determining a surveillance device and performing two-way verification with the surveillance device; sending, in response to successful two-way verification, a first upgrade instruction to at least one of the surveillance device and the terminal device, wherein a server communicates with the terminal device via the surveillance device, and the first upgrade instruction includes an encrypted upgrade file, encrypted server identification information, and an encrypted first check value.

11 Claims, 8 Drawing Sheets

(56) References Cited

U.S. PATENT DOCUMENTS

| | | | |
|---|---|---|---|
| 2020/0151335 A1* | 5/2020 | Ayoub | H04L 9/0822 |
| 2020/0259667 A1* | 8/2020 | Garnier | H04L 67/12 |
| 2021/0051000 A1 | 2/2021 | Yang et al. | |

FOREIGN PATENT DOCUMENTS

| | | | |
|---|---|---|---|
| CN | 107888577 A | 4/2018 | |
| CN | 109214168 A | 1/2019 | |
| CN | 109889589 A | 6/2019 | |
| CN | 110688133 A | 1/2020 | |
| CN | 110839235 A | 2/2020 | |
| CN | 111182527 A | 5/2020 | |
| CN | 111212121 A | 5/2020 | |
| KR | 20070077525 A | 7/2007 | |
| WO | 2019212403 A1 | 11/2019 | |

\* cited by examiner

900

1000

METHOD FOR UPGRADING IoT TERMINAL DEVICE AND ELECTRONIC DEVICE THEREOF

CROSS-REFERENCE TO RELATED APPLICATION

This application is based on and claims priority to Chinese Patent Application No. 202011060564.6, filed on Sep. 30, 2020, the disclosure of which is herein incorporated by reference in its entirety.

TECHNICAL FIELD

The present disclosure relates to the field of Internet of Things (IoT) technologies, and in particular, relates to a method for upgrading an IoT terminal device and an electronic device thereof.

BACKGROUND

For IoT devices, hardware cannot be modified upon delivery from factory. For expansion of capabilities and repair of vulnerabilities of the devices, upgrades of software applications and firmware are very necessary. A traditional upgrade requires that the IoT device has a physical interface in terms of hardware. During the upgrade, the device is connected via a cable on site to upgrade the applications and firmware. The traditional upgrade is time-consuming and laborious. With expansion of the scale of the IoT, such upgrade has no good feasibility. Therefore, more and more IoT devices are upgraded using the over-the-air (OTA) technology.

In the OTA-based upgrade, a wireless communication interface is only remained on an IoT device side for application and program upgrade. A server sends new software applications/firmware to an IoT terminal device over wireless communication, and old code on the terminal device is replaced with new application/firmware code, such that the upgrade is completed.

SUMMARY

Embodiments of the present disclosure provides a method for upgrading an IoT terminal device and an electronic device thereof.

In a first aspect of the embodiments of the present disclosure, a method for upgrading an IoT terminal device is provided. The method is applicable to a server. The method includes:

determining a surveillance device and performing two-way verification with the surveillance device;
sending, in response to successful two-way verification, a first upgrade instruction to at least one of the surveillance device and a terminal device, wherein the server communicates with the terminal device via the surveillance device, and the first upgrade instruction includes an encrypted upgrade file, encrypted server identification information, and an encrypted first check value.
The first upgrade instruction including the encrypted upgrade file, the encrypted server identification information, and the encrypted first check value, the first upgrade instruction means that the upgrade file, the server identification information, and the first check value are all encrypted.

In some embodiments, in the case that the surveillance device is a gateway device in an IoT system, performing two-way verification with the surveillance device includes:

sending a second upgrade instruction to the surveillance device, wherein the second upgrade instruction includes encrypted server identification information;
receiving first confirmation information from the surveillance device, wherein the first confirmation information includes encrypted surveillance device identification information; and
decrypting the first confirmation information and verifying the surveillance device identification information.

In some embodiments, the method further includes:

receiving second confirmation information from the surveillance device, wherein the second confirmation information includes the encrypted surveillance device identification information and terminal device identification information returned by each terminal device and a second check value returned by each terminal device;
comparing the first check value with the second check value; and
sending, in response to verifying that the first check value and the second check value are consistent, first upgrade completion confirmation information to the surveillance device.

In some embodiments, the method further includes:

recording, in response to verifying that the first check value and the second check value are inconsistent, the terminal device identification information of the terminal device with the second check value inconsistent with the first check value, and outputting first warning information.

In some embodiments, in the case that the surveillance device is a terminal device of the IoT system, determining the surveillance device and performing the two-way verification with the surveillance device includes:

sending a third upgrade instruction and an election instruction to at least two terminal devices in at least one local area network, wherein the third upgrade instruction includes the encrypted server identification information, and the election instruction is configured to elect the surveillance device from the at least two terminal devices in the at least one local area network;
receiving third confirmation information from a first terminal device, and receiving fourth confirmation information of at least one second terminal device in the at least one local area network, wherein the third confirmation information includes encrypted terminal device identification information of the first terminal device, the fourth confirmation information includes the encrypted terminal device identification information of the first terminal device received by the at least one second terminal device, the first terminal device is a terminal device that is elected as the surveillance device, and the second terminal device is a non-surveillance device;
decrypting the third confirmation information and the fourth confirmation information, and comparing the terminal device identification information in the third confirmation information and the terminal device identification information in the fourth confirmation information; and
determining, in response to successful verification of the terminal device identification information, the first terminal device as the surveillance device.

In some embodiments, sending the first upgrade instruction to the surveillance device includes:

sending, using the OTA technology, the first upgrade instruction to the surveillance device successful in the two-way verification in a form of multicast.

In a second aspect of the embodiments of the present disclosure, a method for upgrading an IoT terminal device is provided. The method is applicable to a surveillance device. The method includes:

performing two-way verification with a server;
receiving, in response to successful two-way verification, a first upgrade instruction form the server, wherein the first upgrade instruction includes an encrypted upgrade file, encrypted server identification information, and an encrypted first check value;
decrypting the first upgrade instruction and verifying the server identification information; and
sending, in response to successful verification of the server identification information and the surveillance device being a gateway device of an IoT system, a fourth upgrade instruction to the terminal device in a local area network to which the surveillance device belongs, wherein the fourth upgrade instruction includes the encrypted upgrade file, the encrypted server identification information, the encrypted surveillance device identification information, and the encrypted first check value.

In some embodiments, in the case that the surveillance device is a gateway device in the IoT system, performing two-way verification with the server includes:

receiving a second upgrade instruction from the server, wherein the second upgrade instruction includes the encrypted server identification information;
decrypting the second upgrade instruction and verifying the server identification information; and
returning, in response to successful verification of the server identification information, first confirmation information to the server, wherein the first confirmation information includes the encrypted surveillance device identification information.

In some embodiments, the method further includes:
receiving fifth confirmation information from each terminal device in the local area network to which the surveillance device belongs, wherein the fifth confirmation information includes encrypted terminal device identification information and a second check value;
decrypting the fifth confirmation information and verifying the terminal device identification information; and
returning, in response to successful verification of the terminal device identification information, second confirmation information to the server, wherein the second confirmation information includes the encrypted surveillance device identification information, and the second confirmation information further includes the encrypted terminal device identification information and the second check value which are returned by each terminal device in the local area network to which the surveillance device belongs.

In some embodiments, in response to successful verification of the terminal device identification information, the method further includes:

comparing the first check value with the second check value,
returning, in response to verifying that the first check value and the second check value are consistent, the second confirmation information to the server; and
recording, in response to verifying that the first check value and the second check value are inconsistent, the terminal device identification information of the terminal device with the second check value inconsistent with the first check value, and returning second warning information to the server.

In some embodiments, the second confirmation information further includes the encrypted first check value received by the surveillance device for verification by the server.

In some embodiments, the method further includes:
receiving first upgrade completion confirmation information from the server; and
sending, based on the first upgrade completion confirmation information, second upgrade completion confirmation information to the terminal device.

In a third aspect of the embodiments of the present disclosure, a method for upgrading an IoT terminal device is provided. The method is applicable to the terminal device. The method includes:

receiving a first upgrade instruction from a server or a fourth upgrade instruction from a surveillance device, wherein the first upgrade instruction includes an encrypted upgrade file, encrypted server identification information, and an encrypted first check value, and the fourth upgrade instruction includes the encrypted upgrade file, the encrypted server identification information, the encrypted surveillance device identification information and the encrypted first check value;
decrypting the first upgrade instruction or the fourth upgrade instruction and verifying the identification information, wherein in the first upgrade instruction, the identification information includes the server identification information, and in the fourth upgrade instruction, the identification information includes the server identification information and the surveillance device identification information;
calculating, in response to successful verification of the identification information, a second check value and comparing the first check value with the second check value; and
upgrading based on the upgrade file in response to that the first check value and the second check value are verified to be consistent.

In some embodiments, the method further includes:
returning fifth confirmation information to the surveillance device, wherein the fifth confirmation information includes the encrypted terminal device identification information and the second check value.

In some embodiments, in response to verifying that the first check value and the second check value are consistent, the method further includes;
determining whether second upgrade completion confirmation information is received from the surveillance;
performing upgrade according to the upgrade file in response to determining the second upgrade completion confirmation information is received; and
performing no upgrade in response to determining that the second upgrade completion confirmation information is not received.

In some embodiments, the method further includes:
receiving a third upgrade instruction and an election instruction from the server, wherein the third upgrade instruction includes encrypted server identification information;
broadcasting first election information to other terminal devices in a local area network, and receiving second election information broadcast by other terminal devices in the local area network;
comparing the first election information with the second election information;

sending, in response to the first election information being greater than the second election information, third confirmation information for election to be the surveillance device to the server, wherein the third confirmation information includes the encrypted terminal device identification information;

sending, in response to the first election information being less than the second election information, fourth confirmation information for election of other terminal devices to be the surveillance device to the server, wherein the fourth confirmation information includes received terminal device identification information of a first terminal device, and the first terminal device is a terminal device elected to be the surveillance device; and randomly changing, in response to the first election information being equal to the second election information, the first election information and broadcasting the changed first election information again.

Changing the first election information includes increasing or decreasing the first election information.

In a fourth aspect of the embodiments of the present disclosure, a server is provided. The server includes:

a communication unit, configured to communicate with a surveillance device;

a memory, configured to store a set of instructions; and at least one processor, configured to load and execute the set of instructions to perform the method according to the first aspect.

In a fifth aspect of the embodiments of the present disclosure, a surveillance device is provided. The surveillance device includes:

a communication unit, configured to communicate with a server and a terminal device;

a memory, configured to store a set of instructions; and at least one processor, configured to load and execute the set of instructions to perform the method according to the second aspect.

In a sixth aspect of the embodiments of the present disclosure, a terminal device is provided. The terminal device includes:

a communication unit, configured to communicate with a surveillance device;

a memory, configured to store a set of instructions; and at least one processor, configured to load and execute the set of instructions to perform the method according to the third aspect.

In a seventh aspect of the embodiments of the present disclosure, an IoT system is provided. The IoT system includes:

the server according to the fourth aspect;

at least one surveillance device according to the fifth aspect; and at least one terminal device according to the sixth aspect;

wherein the server communicates with the terminal device via the surveillance device.

DETAILED DESCRIPTION

For clearer descriptions of the objectives, technical solutions, and advantages of the present disclosure, further detailed descriptions are made to the present disclosure hereinafter with reference to the accompanying drawings in combination with embodiments.

It needs to be noted that unless otherwise defined, technical terms or scientific terms used in the present disclosure shall be taken to mean the ordinary meanings as understood by the ordinary skill in the art to which the present disclosure belongs. The terms "first," "second," and other similar terms used in the present disclosure do not denote any order, quantity, or importance, but are merely configured to distinguish different components. The term "include" or "contain," and other similar terms are intended to mean that the elements or objects before said term cover the elements or objects or their equivalents listed after the term, without excluding other elements or objects. The term "connection" or "connected" and other similar terms are not limited to physical or mechanical connection, and may include electrical connection and the connection may be direct or indirect.

In an OTA-based upgrade process in the related art, since data is transmitted wirelessly in air, anyone can receive the data for analysis, and anyone can try to send their own data in the same frequency band to interfere with or imitate OTA-based upgrade. It means that potential attackers can try to crack issued application/firmware code or inject illegal applications/firmware into a terminal device, such that security in the OTA-based upgrade is particularly important.

In some cases, in order to improve the security of the OTA-based upgrade, a one-to-one two-way connection is required to be established between a server and the terminal device, resulting in a slow and inefficient upgrade process.

Figure 1:
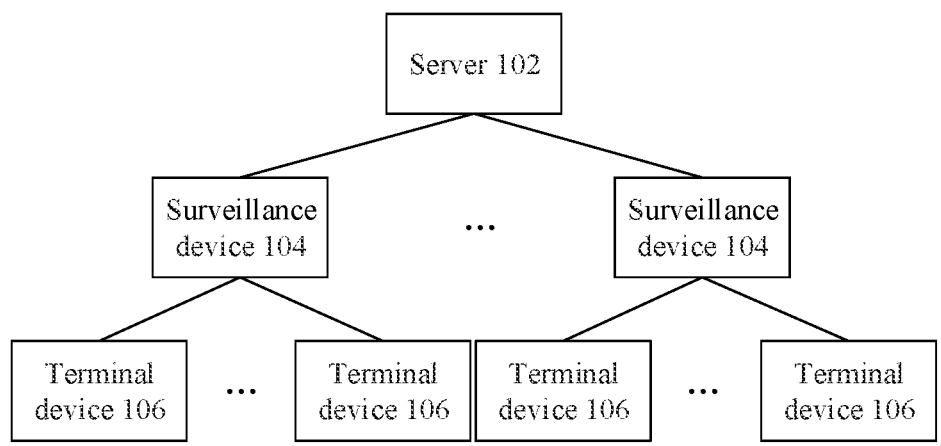
FIG. 1 is a schematic diagram of an exemplary structure of an IoT system according to the present disclosure.

FIG. 1 shows an exemplary structural diagram of an IoT system 100 according to an embodiment of the present disclosure. As shown in FIG. 1, the IoT system 100 includes a server 102, surveillance devices 104, and terminal devices 106.

The server 102 is a device that initiates the OTA-based upgrade. A user publishes a code file (an upgrade file) that needs to be updated and upgraded to the server 102 to perform an update operation, and the server 102 performs upgrade publishing. In some embodiments, the server 102 may be a single server or a server cluster.

The server 102 may store server identification information, for example, a server certificate. The server identification information may be fixed or regularly updated, or may be provided by a publisher during each update and upgrade.

The server 102 may store an encryption key. In the case that an asymmetric encryption mode is used, the server 102 may store a private key. The private key is one of asymmetric encryption key pairs of the server 102. The private key may be a fixed private key, a series of private keys set respectively for each surveillance device 104 (the private key corresponding to each surveillance device 104 is different), or may be updated and changed in an agreed way. The server 102 may also store a public key of each surveillance device 104, wherein the public key is configured to decrypt encrypted information sent by the surveillance device 104.

The surveillance device 104 is responsible for an intermediate link of two-way check. In some embodiments, the surveillance device 104 may be a dedicated gateway or a certain selected terminal device 106.

The surveillance device 104 may store unalterable and unique surveillance device identification information (for example, a surveillance device certificate). Such surveillance device identification information may be burned into the surveillance device in advance, and may also be provided by a physical unclonable function (PUF) device in the surveillance device 104.

The surveillance device 104 may store the encryption key. In the case that the asymmetric encryption mode is adopted, the server 102 may store a private key of the surveillance device. The private key is one of the asymmetric encryption key pairs. The private key of each surveillance device 104 is different. The private key may be fixed, or may also be updated and changed in an agreed way. The surveillance device 104 may also store a public key of the server 102, which is configured to decrypt encrypted information sent by the server 102. The surveillance device 104 may also store a public key of each terminal device 106, wherein the public key to decrypt encrypted information sent by each terminal device 106.

The terminal device 106 is an underlying IoT device node.

The terminal device 106 may store unalterable and unique terminal device identification information (for example, a terminal device certificate). Such terminal device identification information may be burned into the terminal device in advance, or may also be provided by a PUF device in the terminal device 106.

The terminal device 106 may store the encryption key. Where the asymmetric encryption mode is adopted, the terminal device 106 may store a private key. The private key is one of the asymmetric encryption key pairs, and the private key of each terminal device 106 is different. The private key may be fixed, or may be changed in an agreed way. The terminal device 106 may also store the public key of the surveillance device 104, which is configured to decrypt the encrypted information sent by the surveillance device 104. The terminal device 106 may also store the public key of the server 102, which is configured to decrypt the information encrypted by the server 102 and forwarded by the surveillance device 104. The same or different private keys may be used for different terminal devices 106 in the same local area network.

The surveillance device 104 and the server 102 are connected via a network. The terminal device 106 is generally connected to the server 102 via a dedicated or general gateway for network connection. The terminal devices 106 connected to the same gateway form a local area network, and there may be one or more surveillance devices 104 in one local area network. In some cases, one surveillance device 104 is configured to reduce the number of two-way connections that the server 102 needs to establish with the surveillance device 104. In the case of adopting the general gateway, the terminal devices 106 in the same local area network may communicate with each other directly or via a gateway. Therefore, in this scenario, in the case that one of the terminal devices 106 is selected as the surveillance device 104, the surveillance device 104 and the terminal device 106 may communicate with each other directly or via a gateway.

In some embodiments, each device (for example, the server 102, the surveillance device 104 and the terminal device 106) in the IoT system 100 stores its own corresponding sensitive information (for example, the identification information and the encryption key). The sensitive information may be stored in a secure storage area of each device and can be encrypted during storage. Generally, each device only stores its own identification information and its own private key, as well as the public keys of other devices, without saving the private keys of other devices. In some embodiments, in the case that one or more of the terminal devices 106 is selected as the surveillance device 104, the terminal device 106 needs to store two pairs of keys in advance, wherein a first key pair is shared by respective terminal devices 106 in the same local area network. That is, the first key pair of respective terminal devices 106 in the same local area network is the same. A second key pair is an independent and unique key pair of each terminal device, which is configured to serve as a surveillance device key where the terminal device 106 is elected to be the surveillance device 104.

Figure 2:
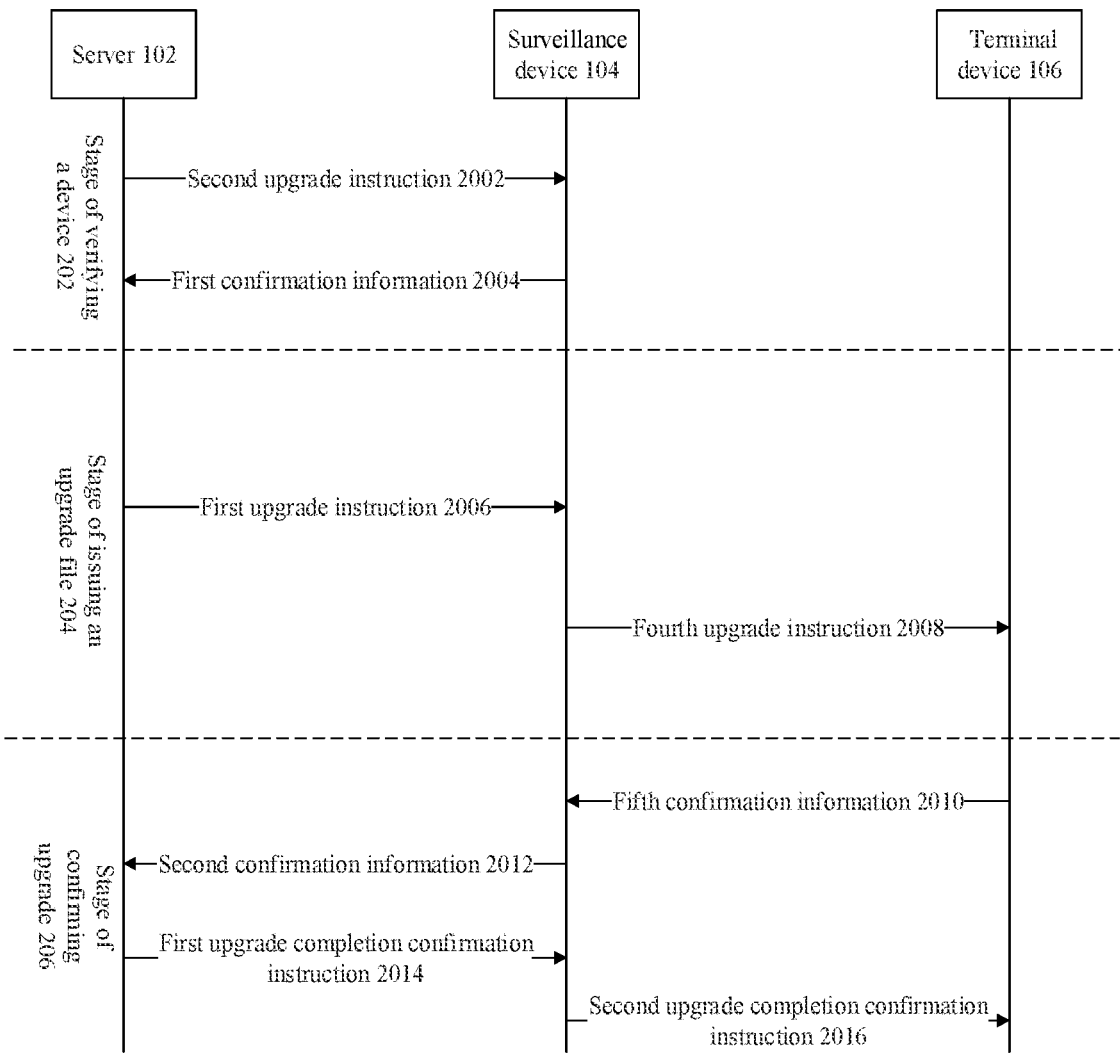
FIG. 2 is an exemplary schematic flowchart of a method for upgrading an IoT terminal device according to the present disclosure.

FIG. 2 shows an exemplary schematic flowchart of a method 200 for upgrading an IoT terminal device according to an embodiment of the present disclosure, and exemplarily illustrates an operating process of the method 200 where a dedicated gateway is used as the surveillance device 104.

Generally, each time a connection is established between the server 102 and the surveillance device 104, upgrade may be initiated to all terminal devices 106 in one local area network.

As shown in FIG. 2, at a device verification stage 202, the following steps are mainly performed.

The server 102 sends a second upgrade instruction 2002 to the surveillance device 104, accompanying with server identification information (for example, a server certificate), and all information is encrypted with a public key of the surveillance device.

The surveillance device 104 decrypts the encrypted information with a private key of the surveillance device, and replies first confirmation information 2004 to the server 102 to confirm a connection in response to verifying the server identification information. The first confirmation information 2004 is accompanied by surveillance device identification information (for example, a supervisor device certificate), and all information is encrypted with a public key of the server.

The server 102 decrypts the encrypted information with a private key of the server and verifies the surveillance device identification information.

Upon successful verification, a two-way reliable connection has been established between the server 102 and the surveillance device 104, such that the security of communication between the server and the surveillance device is ensured.

In the above process, in the case that verification of the server identification information by the surveillance device fails, or verification of the surveillance device identification information by the server fails, device verification fails. It should be noted that in the case that a check or verification process is involved in subsequent steps, the subsequent steps may only be continued in response to successful verification or check. In the case that the verification or check fails, usually the subsequent steps may not be continued.

As shown in FIG. 2, at an upgrade file issuing stage 204, the following steps are mainly performed.

The server 102 issues a first upgrade instruction 2006 to the surveillance device 104. The first upgrade instruction 2006 includes an upgrade file, a first check value, and the server identification information, and may also include a distribution instruction. All information is encrypted with the public key of the surveillance device. In some embodiments, the first check value may be calculated based on a preset check value algorithm, and a calculation mode, such as SHA-1, SHA-2, or MD5, may be adopted for calculation. In some embodiments, the first check value may be calculated based on relevant information of the upgrade file. In some embodiments, the first check value may also be calculated based on the server identification information, may also be calculated based on all information in the first upgrade instruction 2006, and so on, and the data for calculating the check value may be selected as needed.

The surveillance device 104 decrypts the encrypted information with the private key of the surveillance device, verifies the server identification information, and in response to successful verification, sends a fourth upgrade instruction 2008 to each terminal device 106 in the local area network to which the surveillance device 104 belongs, so as to distribute the upgrade file, the first check value, and the server identification information, which need to be distributed to each terminal device 106 in the local area network to which the surveillance device 104 belongs, are accompanied by the surveillance device identification information, and are encrypted by a public key of the terminal device.

At this time, the process of issuing the upgrade file is completed.

As shown in FIG. 2, at an upgrade confirmation stage 206, the following steps are mainly performed.

The terminal device 106 decrypts the encrypted information with the private key of the terminal device, verifies the server identification information and the surveillance device identification information, acquires the upgrade file, calculates a second check value of the upgrade file, and compares with the received first check value.

As an optional embodiment, in a one-way verification solution, in the case that the two check values are verified to be consistent, the upgrade may be confirmed.

Each terminal device 106 returns fifth confirmation information 2010 to the surveillance device to send the calculated second check value and the terminal device identification information to the surveillance device 104 and encrypts with the public key of the surveillance device.

The surveillance device 104 verifies the terminal device identification information of each terminal device 106, and compares the second check value returned by each terminal device 106 with the first check value received by the surveillance device 104 from the server 102.

In some embodiments, the surveillance device 104 sends second confirmation information 2012 to the server in response to successful verification of the terminal device identification information and verifying that the check values are consistent, so as to encrypt and then return the summarized terminal device identification information and the second check value of each terminal device 106, the first check value received by the surveillance device 104 from the server 102, and the surveillance device identification information to the server 102 for confirmation.

In some embodiments, in response to successful verification of the terminal device identification information and the second check value of each terminal device 106 and the surveillance device certification information, the server 102 replies a first upgrade completion confirmation instruction 2014 to the surveillance device 104; otherwise, the identification information of the terminal device with an error is recorded, and first warning information is sent to the surveillance device 104 or a designated device to remind relevant personnel that there is a security problem in the system.

The surveillance device 104 sends a second upgrade completion confirmation instruction 2016 to each terminal device 106 based on the first upgrade completion confirmation instruction 2014 of the server 102 or its own result indicating that the check values are verified to be consistent, otherwise, the terminal device identification information is recorded and second warning information is sent to the server 102 to report the error.

At this time, the entire upgrade process is completed.

It should be noted that all the encryption processes mentioned above adopt the asymmetric encryption mode. In fact, a hybrid encryption mode may also be used, that is, a random symmetric key is configured to encrypt the information, then the symmetric key is encrypted by the asymmetric encryption mode, and the asymmetrically encrypted symmetric key is added when transmitting information.

It should also be noted that all the above asymmetric encryption/decryption processes rely on the public keys and private keys stored in the devices. In the asymmetric encryption process, a sender and a receiver may use predetermined fixed key pairs, or may also use the key pairs changing based on a predetermined rule, for example, time and other instruction information are added to the information, and the receiver may determine the required decryption key in an agreed mode based on the instruction information.

In addition, the above process of verifying the certificate information may compare the certificate information/certificate check values with a certificate/certificate check value whitelist stored by itself (for the terminal device 106 and the surveillance device 104, burning and fixing in advance are required; and for the server 102, registration under manual surveillance where the terminal device 106 is installed and deployed is required), may contain a certain specific law in the certificate information, or may also be a combination of the previous two modes.

It should also be noted that in this embodiment, the surveillance device 104 is a dedicated gateway. In some embodiments, during deployment of the terminal device 106, certificate information of the dedicated gateway is added to a surveillance device certificate whitelist of the terminal device 106 under the manual surveillance. The certificate information of the terminal device 106 is added to the surveillance device certificate whitelist of the surveillance device 104 one by one. At the same time, during surveillance of the terminal device 106, under manual surveillance, the unified public key of the terminal device 106 is stored in the surveillance device 104, or the public key corresponding to the private key of each terminal device 106 is stored in the surveillance device 104 one by one.

It can be seen from the above embodiments that the method for upgrading the IoT terminal device according to the present disclosure adopts a hierarchical and distributed two-way verification OTA-based upgrade security verification mechanism. The surveillance device is selected in one local area network and two-way verification is performed between the server and the surveillance device to confirm legitimacy of both parties. Meanwhile, after the upgrade file is issued, each terminal device performs calculation of the check value and identity verification. Besides, each terminal device sends the calculated check value to the surveillance device. The surveillance device confirms these check values by itself or by the server, and an old file is replaced with the upgrade file in the case that the check values is correct. The technical solution also has the high security of a two-way verification mechanism, and uses a hierarchical and distributed method to improve the speed of the OTA-based upgrade.

The method for upgrading the IoT terminal device according to the embodiment of the present disclosure splits ordinary two-way verification into two levels: server-surveillance device and surveillance device-terminal device. The two-way verification is adopted between the server and the surveillance device; and as a dedicated gateway, the surveillance device generally has more computing, storage resources and sufficient power supply, and is more trustworthy (better protected). Therefore, the surveillance device is regarded as a center, and respective terminal devices in the local area network report own information one by one for two-way confirmation. In this way, tips of the two-way confirmation are distributed to the gateway, which improves an overall speed.

Figure 3:
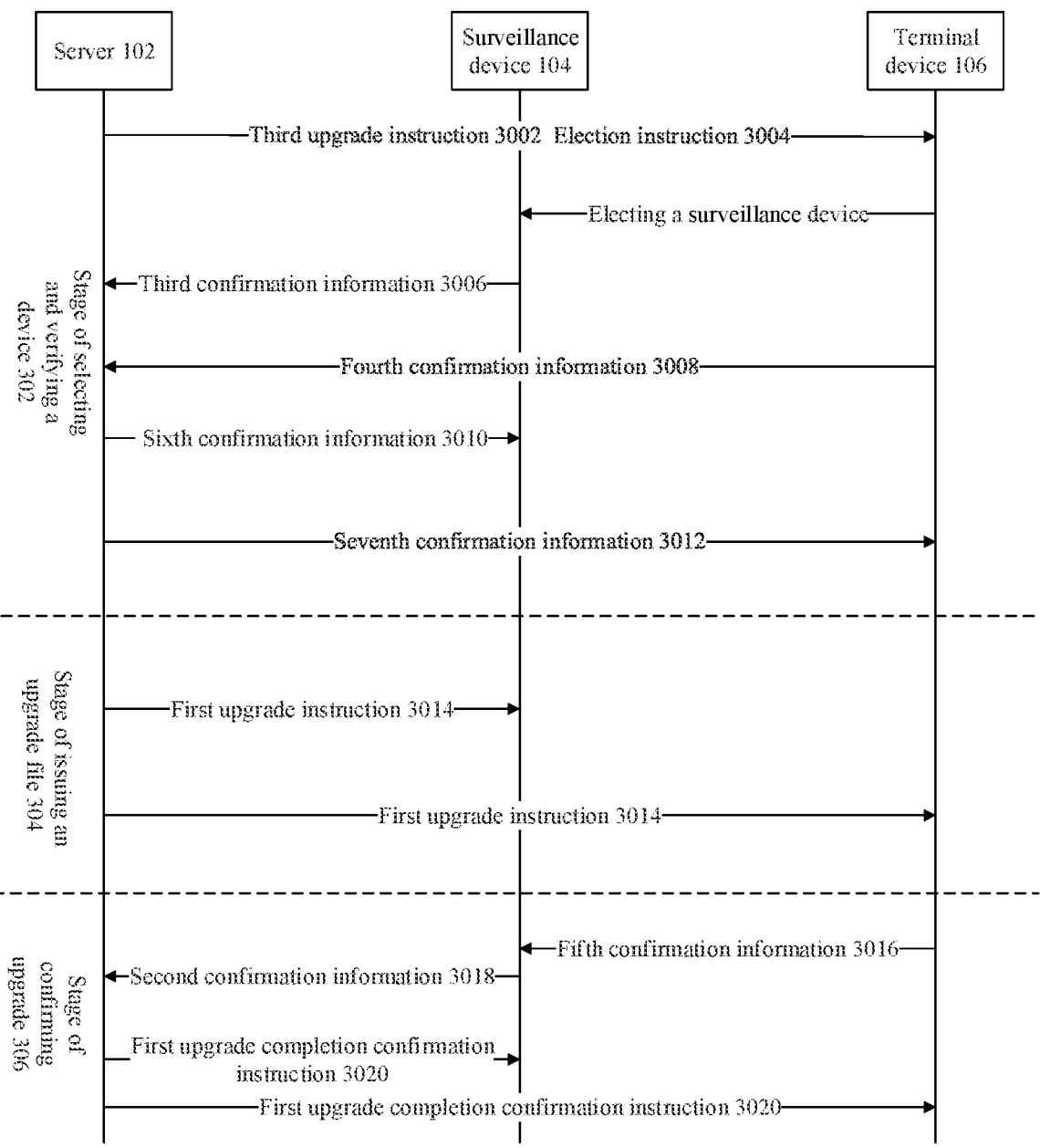
FIG. 3 is another exemplary schematic flowchart of a method for upgrading an IoT terminal device according to the present disclosure.

FIG. 3 shows another exemplary schematic flowchart of a method 300 for upgrading an IoT terminal device according to an embodiment of the present disclosure, and exemplarily illustrates an operating process of the method 300 where the terminal device is used as the surveillance device 104.

In some embodiments, each terminal device 106 belonging to the same local area network stores the same first terminal device key pair, including a first private key and a corresponding first public key. Each terminal device 106 may also have its own independent second key pair, including a second private key and a corresponding second public key.

Each time the server is connected, the upgrade may be initiated on some or all nodes in one local area network.

As shown in FIG. 3, at a device selection and verification stage 302, the following steps are mainly performed.

The server 102 sends a third upgrade instruction 3002 to the terminal device 106 to be upgraded in the local area network, accompanied by a server certificate; and an election instruction 3004 is sent to all the terminal devices 106, and all information is encrypted with a general public key (the first public key).

All the terminal devices 106, in response to receiving the election instruction, sequentially broadcast their own first election information encrypted with the general public key (the first public key) of the terminal device in the local area network (such that each terminal device can use the first private key saved by itself for decryption) and a terminal device certificate encrypted with a public key of the server (such that other terminal devices can only record but cannot decrypt ciphertext).

In some embodiments, the first election information is information used to select the surveillance device, and the information may be an indicator related to a computing capability of the terminal device 106, or power supply information of the terminal device 106, or a trustworthy indicator of the terminal device 106, or the like. In some embodiments, the first election information may be battery remaining power amount information of the terminal device 106.

Each terminal device 106 may compare its own first election information with received second election information of other terminal devices 106. In the case that the own first election information is the same as the received certain second election information, a value of the own first election information may be randomly increased or decreased a bit and then the first election information is broadcast by the terminal device 106. In this way, each terminal device 106 can know whose election information has the largest value (including the terminal device with the largest election information itself), and its corresponding terminal device certificate encrypted with the public key of the server.

The terminal device 106 with the largest election information regards itself as the surveillance device 104, and its terminal device certificate is a surveillance device certificate.

In some embodiments, the terminal device 106 with the largest election information uses its own independent private key (the second private key) as a private key of the surveillance device, and uses its own independent public key (the second public key) as a public key of the surveillance device. Then the public key of the surveillance device and the surveillance device certificate information encrypted with the public key of the server are encrypted with the general public key (the second private key) and then broadcast to other terminal devices 106 in the local area network.

The surveillance device 104 reports a selected result (third confirmation information 3006) to the server 102, which is accompanied by its own surveillance device certificate information encrypted with the public key of the server. At least one non-surveillance device terminal device 106 (which may be selected according to an agreed method, for example, the terminal device 106 with the second highest election information) also reports a selected result (fourth confirmation information 3008) to the server 102, which is accompanied by the surveillance device certificate of the surveillance device 104 considered by itself and encrypted with the public key of the server, as well as its own terminal device certificate encrypted with the public key of the server.

In response to receiving the aforementioned at least two pieces of information, the server 102 confirms the same terminal device as the surveillance device 104, and then sends a confirmation selection result (sixth confirmation information 3010 and seventh confirmation information 3012, both of which include the surveillance device certificate encrypted with the public key of the server) to the surveillance device 104 and other terminal devices 106, accompanied by the server certificate information as verification. As mentioned earlier, each terminal device 106 can know whose election information is the largest and its corresponding terminal device certificate encrypted with the public key of the server. Therefore, the server 102 can compare whether the surveillance device certificate information encrypted with the public key of the server in the received at least two pieces of information is consistent.

At this time, the surveillance device 104 has been selected and the two-way verification between the server 102 and the surveillance device 104 has been completed.

As shown in FIG. 3, at an upgrade file issuing stage 304, the following steps are mainly performed.

The server 102 sends a first upgrade instruction 3014 to all terminal devices 106 to be upgraded and the surveillance device 104, wherein the first upgrade instruction includes an upgrade file, a first check value of the upgrade file and a server certificate, which are encrypted with general public key (the first public key) of the terminal device.

In the case that the terminal device 106 to be upgraded and the surveillance device 104 are decrypted with a general private key (the first private key) of the terminal device, a second check value of the upgrade file is calculated and compared the second check value of the upgrade file with the first check value.

As shown in FIG. 3, at an upgrade confirmation stage 306, the following steps are mainly performed.

The terminal device 106 to be upgraded encrypts the second check value and its own terminal device certificate encrypted with the public key of the server with the general public key (the first public key) (fifth confirmation information 3016), and then sends the same to the surveillance device 104. Upon summarization, the surveillance device 104 sends second confirmation information 3018 (if the surveillance device 104 is also to be upgraded, the second check value calculated by itself and the surveillance device certificate information may be added) to the server 102 for verification.

In response to verifying that the second confirmation information is correct, the server 102 sends a first upgrade completion confirmation instruction 3020 to all terminal devices 106 to be upgraded and the surveillance device 104, accompanied by its own server certificate information. In the case that the terminal devices 106 to be upgraded and the surveillance device 104 are confirmed, an upgrade of replacing the old file with the upgrade file may be performed.

In some embodiments, the terminal device 106 to be upgraded may also encrypt the second check value and the terminal device certificate information encrypted with the public key of the server with the public key of the surveillance device and send the same to the surveillance device 104.

In some embodiments, the surveillance device 104 may also compare the summarized second check value of each terminal device 106 with the first check value received by itself, so as to find an error, immediately terminate the upgrade and report the error to the server 102.

In some embodiments, whenever the surveillance device 104 or the terminal device 106 finds an error, relevant information should be immediately reported to the server 102; and the server 102 should record and give an alert in response to finding or receiving error information.

It should be noted that all the encryption processes mentioned above are asymmetric encryption modes by default. In fact, a hybrid encryption mode may also be used, that is, a random symmetric key is configured to encrypt the information, then the symmetric key is encrypted with the asymmetric encryption mode, and the asymmetrically encrypted symmetric key is added during information transmission. The related art belongs to well-known knowledge.

It should also be noted that all the above asymmetric encryption/decryption processes rely on the public keys and private keys stored in the devices. For the asymmetric encryption process, a sender and a receiver may use predetermined fixed key pairs, or may use the key pairs changing based on a predetermined rule, for example, time and other instruction information are added to the information, and the receiver may determine the required decryption key in an agreed mode based on the instruction information. Related art belongs to well-known technologies.

In addition, the above process of verifying the certificate information may compare the certificate information/certificate check values with a certificate/certificate check value whitelist stored by itself (for the terminal device and the surveillance device, burning and fixing in advance are required; and for the server, registration under manual surveillance where the terminal device is installed and deployed is required), may contain a certain specific law in the certificate information, or may also be a combination of the previous two modes. Related art belongs to well-known technologies.

It can be seen from the above embodiment that the method for upgrading the IoT terminal device according to the present disclosure adopts a hierarchical and distributed two-way verification OTA-based upgrade security verification mechanism. The surveillance device is selected in one local area network and two-way verification is performed between the server and the surveillance device to confirm legitimacy of both parties. Meanwhile, in the case that the upgrade file is issued, each terminal device performs calculation of the check value and identity verification. Besides, each terminal device sends the calculated check value to the surveillance device. The surveillance device confirms these check values per se or by the server, and the old file is replaced with the upgrade file in the case that the check values are confirmed to be correct. The technical solution also achieves the high security of a two-way verification mechanism, and improves the speed of the OAT upgrade by using a hierarchical and distributed method.

In the method for upgrading the IoT terminal device according to this embodiment, there is no dedicated gateway to be used as the surveillance device, such that the terminal device needs to be selected as the surveillance device. The terminal device is used as the surveillance device and should not acknowledge the certificate information of other terminal devices, and vice versa, the certificate information encrypted with the public key of the server is used instead, and can be compared and distinguished, but cannot be analyzed. In addition, the terminal device serving as the surveillance device is not as trustworthy as a dedicated gateway, except for summarizing other information sent from other terminal devices, other information is directly multicast via the server or unicast to the terminal device to a greater extent, and the surveillance device can only deny the upgrade by itself but cannot grant the upgrade by itself.

For a general OTA-based upgrade solution in the related art, the terminal device only verifies the received upgrade file and server certificate/signature and other identity information locally, and the security completely depends on no leaking of the server information. For this purpose, the method for upgrading the IoT terminal device according to the present disclosure adopts two-way verification. The terminal device needs to seek verification for the data received by itself from the surveillance device, and the surveillance device seeks verification from the server.

For some two-way verification OTA-based upgrade solutions in the related art, the server needs to establish a two-way connection with each device to be upgraded one by one. The upgrade speed is slower and not suitable for batch upgrade of a large number of IoT devices. For this reason, the method for upgrading the IoT terminal device according to the present disclosure divides the two-way verification into two levels. After summarization of the surveillance device, verification is sought from the server, and the upgrade speed is greatly improved.

In some related technical solutions, a wireless connection between the server and the terminal device is easily broken during physical separation, which is difficult to be found upon a reconnection. For this reason, the method for upgrading the IoT terminal device according to the present disclosure surveils the upgrade process by the stably connected surveillance device during the upgrade, and the reconnected device can be inspected.

It can be seen that the method for upgrading the IoT terminal device according to the present disclosure acquires the security equivalent to that of the two-way verification OTA-based upgrade mode. Meanwhile, in the method for upgrading the IoT terminal device according to the present disclosure, its verification process is decentralized to the levels of the terminal device and the surveillance device, the number of two-way connections that the server needs to establish decreases from the number of the terminal devices to the number of local area networks of the surveillance device. The server can initiate the OTA-based upgrade in a multicast form, and the upgrade speed is significantly higher than an ordinary two-way verification OTA-based upgrade mode (a one-to-one upgrade mode established between the server and the terminal device). In addition, by the method for upgrading the IoT terminal device according to the present disclosure, the terminal device that has been tampered with and cracked can be found in time even in the case that the terminal device is attacked offline.

The method for upgrading the IoT terminal device according to the present disclosure adopts two-way verification. In order to implement once illegal upgrade, it is necessary to crack the server certificate information, the server encryption key, the certificate information of the terminal device to be attacked, and the encryption key of the terminal device to be attacked, and at least a terminal device decryption key needs to be cracked in the case of decrypting a source file. Where illegal upgrade is not expected to be found, a data link between the gateway or terminal device and the legitimate server also needs to be cut off.

The method for upgrading the IoT terminal device according to the present disclosure splits the two-way verification between the terminal device and the server into the two-way verification between the surveillance device and the server, and between the terminal device and the surveillance device, and is equivalent to a solution of direct two-way verification between the terminal device and the server in terms of security. However, the hierarchical and distributed solution of this solution greatly reduces the number of two-way connections needing to be managed by the server. The OTA-based upgrade can still be performed in the multicast mode instead of one step, which improves the speed of the OTA-based upgrade of a large number of IoT devices.

Figure 4:
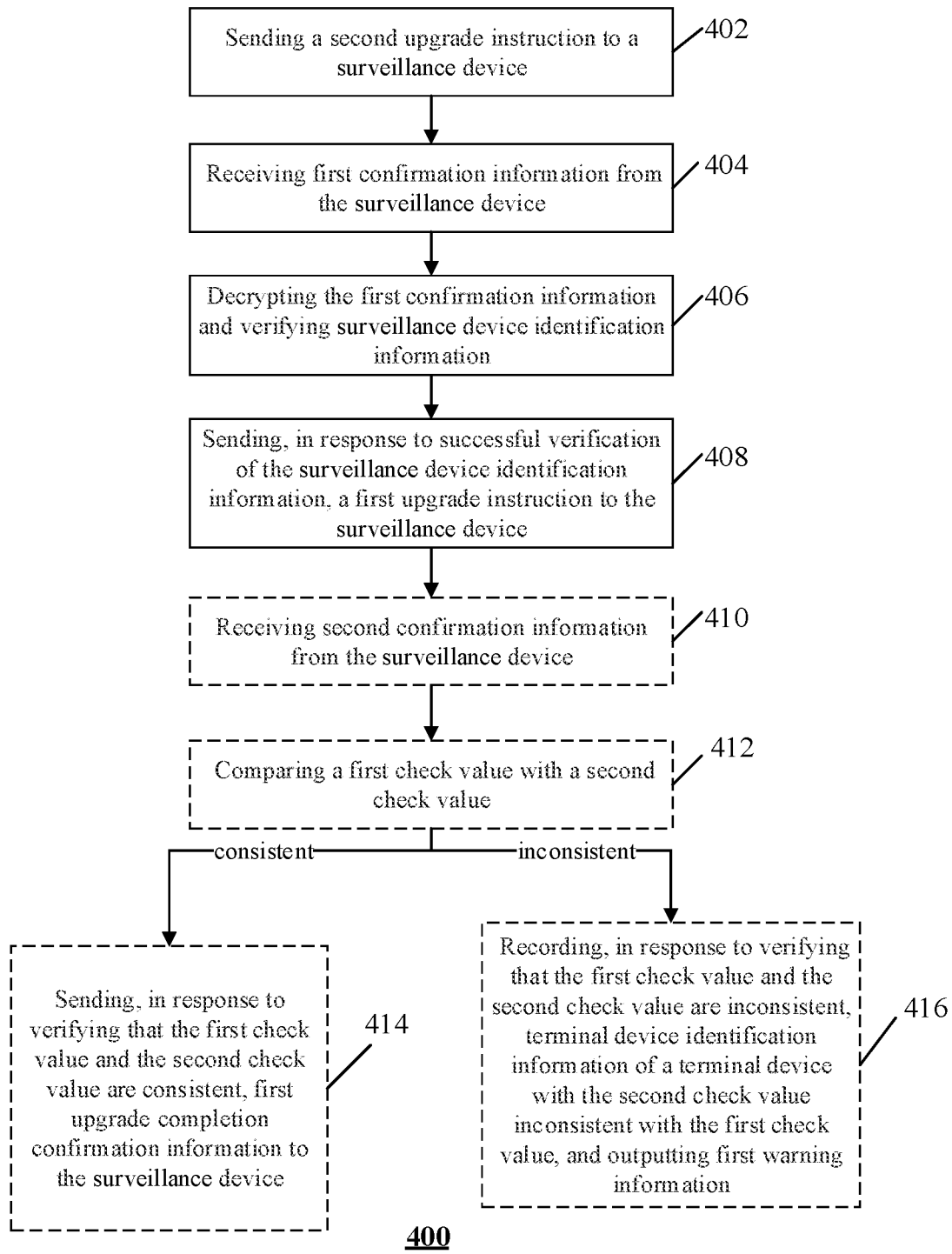
FIG. 4 is yet another exemplary schematic flowchart of a method for upgrading an IoT terminal device according to the present disclosure.

FIG. 4 shows an exemplary schematic flowchart of a method 400 for upgrading an IoT terminal device according to an embodiment of the present disclosure.

As shown in FIG. 4, the method 400 is applicable to the server 102, and the surveillance device 104 is a gateway device. The method 400 includes:

In 402, the service 102 sends a second upgrade instruction 2002 to the surveillance device 104, wherein the second upgrade instruction 2002 includes encrypted server identification information (for example, a server certificate). In some embodiments, an encryption mode may be symmetric encryption, asymmetric encryption or hybrid encryption.

In 404, the service 102 receives first confirmation information 2004 from the surveillance device 104, wherein the first confirmation information 2004 includes encrypted surveillance device identification information (for example, a surveillance device certificate).

In 406, the service 102 decrypts the first confirmation information 2004 and verifies the surveillance device identification information.

In 408, in response to successful verification of the surveillance device identification information, the service 102 sends a first upgrade instruction 2006 to the surveillance device 104, wherein the first upgrade instruction 2006 includes an encrypted upgrade file, the encrypted server identity certificate information and an encrypted first check value. In some embodiments, the check value may be calculated based on the upgrade file, and a method of calculating the check value may be SHA-1. SHA-2, MD5, or the like.

In addition, in the case that the verification of the surveillance device identification information fails, upgrade can be stopped.

It can be seen from the above embodiment that the method for upgrading the IoT terminal device according to the present disclosure ensures the security between the server and the surveillance device by establishing a two-way secure connection between the server and the surveillance device. Meanwhile, by distributing the upgrade file to the terminal device via the surveillance device, compared with a mode that the server directly issues the upgrade file to the terminal device, the number of the two-way connections is reduced and an upgrade speed is increased.

In some embodiments, the method 400 further includes the following steps.

In 410, the sever 102 receives second confirmation information 2012 from the surveillance device 104, wherein the second confirmation information 2012 includes the encrypted surveillance device identification information, terminal device identification information (for example, a terminal device certificate) returned by each terminal device 106 and a second check value; in some embodiments, the second check value is calculated by the terminal device 106 based on the upgrade file received by itself.

In 412, the sever 102 compares the first check value with the second check value.

In 414, in response to verifying that the first check value and the second check value are consistent, the sever 102 sends first upgrade completion confirmation information 2014 to the surveillance device 104.

In 416, in response to verifying that the first check value and the second check value are inconsistent, the sever 102 sends records the terminal device identification information of the terminal device 106 with the second check value inconsistent with the first check value, and outputs first warning information.

In this embodiment, in addition to verifying the identification information, the check values are compared, and in the case that the check values are verified to be inconsistent, the first warning information is issued, such that the security problem is quickly found, and corresponding processing is carried out in time.

In some embodiments, sending the first upgrade instruction to the surveillance device 104 includes:

sending, using the OTA technology, the first upgrade instruction 2006 to the surveillance device successful in verification of the surveillance device identification information, such that the upgrade speed is improved.

In some embodiments, in the case that the surveillance device 104 is the terminal device 106 in the IoT system 100, the sever 102 determines the surveillance device 104 and performs two-way verification with the surveillance device 104 includes:

sending a third upgrade instruction 3002 and an election instruction 3004 to at least two terminal devices 106 in at least one local area network, wherein the third upgrade instruction 3002 includes encrypted server identification information, and the election instruction 3004 is configured to elect the surveillance device 104 from at least two terminal devices 106 in the at least one local area network;

receiving third confirmation information 3006 from the terminal device elected to be the surveillance device 104 and fourth confirmation information 3008 of at least one terminal device 106 in a non-surveillance device in the at least one local area network, wherein the third confirmation information 3006 includes encrypted terminal device identification information of the terminal device elected to be the surveillance device, and the fourth confirmation information 3008 includes encrypted terminal device identification information, received by at least one terminal device in the non-surveillance device, of the terminal device elected to be the surveillance device;

decrypting the third confirmation information 3006 and the fourth confirmation information 3008 and comparing the terminal device identification information in the third confirmation information 3006 and the fourth confirmation information 3008; and determining, in response to successful verification of the terminal device identification information, the terminal device elected to be the surveillance device as the surveillance device 104.

Figure 5:
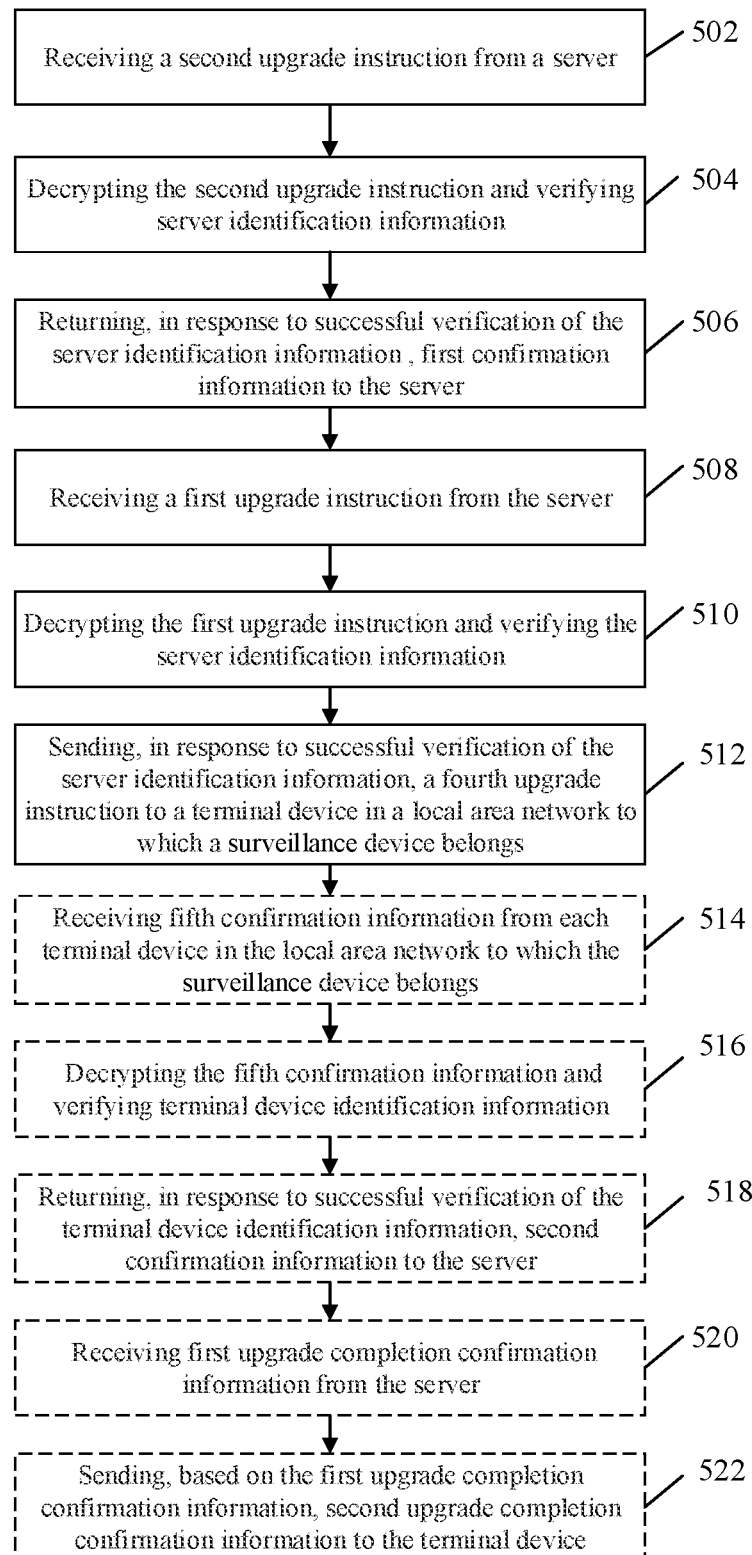
FIG. 5 is still a further exemplary schematic flowchart of a method for upgrading an IoT terminal device according to the present disclosure.

FIG. 5 shows an exemplary schematic flowchart of a method 500 for upgrading an IoT terminal device according to an embodiment of the present disclosure.

As shown in FIG. 5, the method 500 is applicable to the surveillance device 104 which is a gateway device in the IoT system 100. The method 500 includes the following steps.

In 502, the surveillance device 104 receives a second upgrade instruction 2002 from a server, wherein the second upgrade instruction 2002 includes encrypted server identification information.

In 504, the surveillance device 104 decrypts the second upgrade instruction 2002 and verifies server identification information.

In 506, in response to successful verification of the server identification information, the surveillance device 104 returns first confirmation information 2004 to the server 102, wherein the first confirmation information 2004 includes encrypted surveillance device identification information.

In 508, the surveillance device 104 receives a first upgrade instruction 2006 from the server 102, wherein the first upgrade instruction 2006 includes an encrypted upgrade file, the encrypted server identification information, and an encrypted first check value.

In 510, the surveillance device 104 decrypts the first upgrade instruction 2006 and verifies the server identification information.

In 512, in response to successful verification of the server identification information, the surveillance device 104 sends a fourth upgrade instruction 2008 to the terminal device 106 in a local area network to which the surveillance device belongs, wherein the fourth upgrade instruction 2008 includes the encrypted upgrade file, the encrypted server identification information, the encrypted surveillance device identification information, and the encrypted first check value.

It can be seen from the above embodiment that the method for upgrading the IoT terminal device according to the present disclosure ensures the security between the server and the surveillance device by establishing a two-way secure connection between the server and the surveillance device. Meanwhile, by distributing the upgrade file to the terminal device via the surveillance device, compared with a mode that the server directly issues the upgrade file to the terminal device, the number of the two-way connections is reduced and the upgrade speed is increased.

In some embodiments, the method 500 further includes the following steps.

In 514, the surveillance device 104 receives fifth confirmation information 2010 from each terminal device 106 in the local area network to which the surveillance device belongs, wherein the fifth confirmation information 2010 includes encrypted terminal device identification information and an encrypted second check value.

In 516, the surveillance device 104 decrypts the fifth confirmation information 2010 and verifies the terminal device identification information.

In 518, in response to successful verification of the terminal device identification information, the surveillance device 104 returns second confirmation information 2012 to the server 102, wherein the second confirmation information 2012 includes the encrypted surveillance device identification information, the terminal device identification information returned by each terminal device 106 in the local area network to which the surveillance device belongs, and the second check value.

In this embodiment, in addition to verifying the identification information, the second check value is configured for comparison with the check value. In the case that the check values are verified to be inconsistent, first warning information is issued, such that the security problem is quickly found, and corresponding processing is carried out in time.

In some embodiments, the method 500 further includes the following steps.

In 520, the surveillance device 104 receives first upgrade completion confirmation information 2014 from server 102.

In 522, the surveillance device 104 sends second upgrade completion confirmation information 2016 to the corresponding terminal device 106 based on the first upgrade completion confirmation information 2014.

In this embodiment, by feeding back the second upgrade completion confirmation information 2016 to the terminal device 106, the terminal device confirms that the upgrade is safely completed.

In some embodiments, in response to successful verification of the terminal device identification information, the following steps may be further performed:

comparing the first check value with the second check value;

returning, in response to verifying that the first check value and the second check value are consistent, second confirmation information 2012 to the server 102; and recording, in response to verifying that the first check value and the second check value are inconsistent, the terminal device identification information of the terminal device 106 with the second check value inconsistent with the first check value, and returning second warning information to the server 102.

In this embodiment, in addition to verifying the identification information, the check values are compared. In the case that the check values are verified to be inconsistent, the second warning information is sent, such that the security problem is quickly found, and corresponding processing is carried out in time.

In some embodiments, the second confirmation information 2012 may also include the encrypted first check value received by the surveillance device 104 for verification by the server 102.

Figure 6:
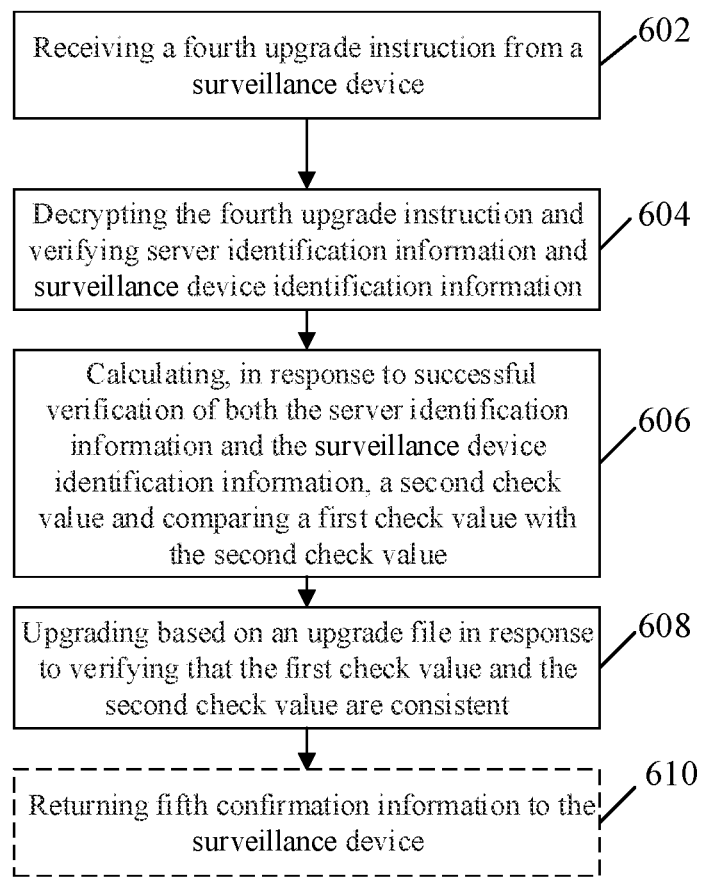
FIG. 6 is an exemplary schematic flowchart of a method for upgrading an IoT terminal device according to the present disclosure.

FIG. 6 shows an exemplary schematic flowchart of a method 600 for upgrading an IoT terminal device according to an embodiment of the present disclosure.

As shown in FIG. 6, the method 600 is applicable to the terminal device 106, and the surveillance device 104 is a gateway device in the IoT system 100. The method 600 includes the following steps.

In 602, the terminal device 106 receives a fourth upgrade instruction 2008 from the surveillance device 104, wherein the fourth upgrade instruction 2008 includes an encrypted upgrade file, encrypted server identification information, encrypted surveillance device identification information, and an encrypted first check value.

In 604, the terminal device 106 decrypts the fourth upgrade instruction 2008 and verifies the server identification information and the surveillance device identification information, In 606, in response to successful verification of both the server identification information and the surveillance device identification information, the terminal device 106 calculates a second check value and compares the first check value with the second check value.

In 608, in response to verifying that the first check value and the second check value are consistent, the terminal device 106 performs the upgrade based on the upgrade file. In addition, in the case that the first check value and the second check value are verified to be inconsistent, no upgrade is performed.

It can be seen from the above embodiment that the method for upgrading the IoT terminal device according to the present disclosure ensures the security between the server and the surveillance device by establishing a two-way secure connection between the server and the surveillance device. Meanwhile, by distributing the upgrade file to the terminal device via the surveillance device, compared with a mode that the server directly issues the upgrade file to the terminal device, the number of two-way connections is reduced and the upgrade speed is increased. In addition, by comparing the check values, security of the upgrade file is ensured.

In some embodiments, the method 600 further includes the following steps.

In 610, the terminal device 106 returns fifth confirmation information 210 to the surveillance device 104, wherein the fifth confirmation information 210 includes encrypted terminal device identification information and the second check value.

In this embodiment, the second check value is provided for comparison with the check value. In the case that the check values are verified to be inconsistent, warning information is sent, such that the security problem is quickly found, and the corresponding processing is carried out in time.

In some embodiments, in response to verifying that the first check value and the second check value are consistent, the method further includes:
determining whether second upgrade completion confirmation information 2016 sent by the surveillance device 104 is received;
upgrading based on the upgrade file in response to determining that the second upgrade completion confirmation information 2016 is received; and
performing no upgrade in response to determining that the second upgrade completion confirmation information 2016 is not received.

In this embodiment, the upgrade is performed only in the case that the second upgrade completion confirmation information 2016 is received, which further ensures security of the upgrade.

Figure 7:
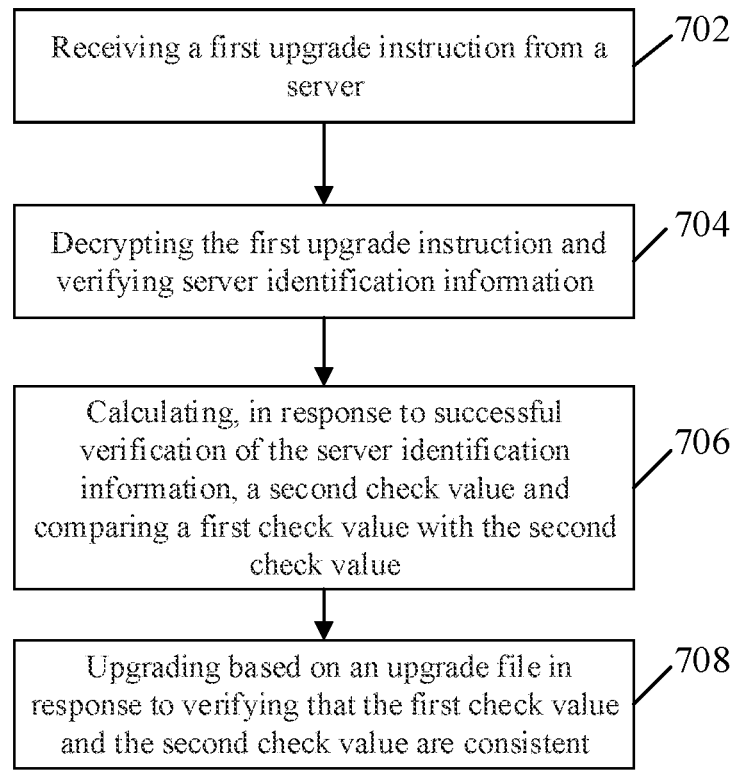
FIG. 7 is another exemplary schematic flowchart of a method for upgrading an IoT terminal device according to the present disclosure.

FIG. 7 shows an exemplary schematic flowchart of a method 700 for upgrading an IoT terminal device according to an embodiment of the present disclosure.

As shown in FIG. 7, the method 700 is applicable to the terminal device 106, and the surveillance device 104 is a terminal device in the IoT system 100. The method 700 includes the following steps.

In 702, the terminal device 106 receives a first upgrade instruction from a server, wherein the first upgrade instruction includes an encrypted upgrade file, encrypted server identification information, and an encrypted first check value.

In 704, the terminal device 106 decrypts the first upgrade instruction and verifies the server identification information.

In 706, in response to successful verification of the server identification information, the terminal device 106 calculates a second check value and compares the first check value with the second check value.

In 708, in response to verifying that the first check value and the second check value are consistent, the terminal device 106 performs the upgrade based on the upgrade file.

It can be seen from the above embodiments that the method for upgrading the IoT terminal device according to the present disclosure ensures the security between the server and the surveillance device by establishing a two-way secure connection between the server and the surveillance device. Meanwhile, by summarizing the confirmation information of the terminal device via the surveillance device, the upgrade speed is increased. In addition, by comparing the check values, security of the upgrade file is ensured.

In some embodiments, referring to FIG. 7, the method 700 further includes:
receiving a third upgrade instruction 3002 and an election instruction 3004 from the server 102, wherein the third upgrade instruction 3002 includes encrypted server identification information;
broadcasting first election information to other terminal devices 106 in the local area network, and receiving second election information broadcast by other terminal devices 106 in the local area network;
comparing the first election information with the second election information;
sending, in response to the first election information being greater than the second election information, third confirmation information 3006 for election to be the surveillance device to the server 102, wherein the third confirmation information 3006 includes encrypted terminal device identification information;
sending, in response to the first election information being less than the second election information, fourth confirmation information 3008 for election of other terminal devices to be the surveillance device to the server 102, wherein the fourth confirmation information 3008 includes the encrypted and received terminal device identification information of the terminal device elected to be the surveillance device; and
randomly increasing or decreasing, in response to the first election information being equal to the second election information, the first election information and broadcasting the increased or decreased first election information again until the supervisor device 104 is elected.

It should be noted that each method embodiment of the present disclosure may be executed by a single device, such as a computer and a server. The method according to this embodiment may also be applied in a distributed scenario, and completed by mutual cooperation of a plurality of devices. In such a distributed scenario, one of these devices may only perform one or more steps in the method of the present disclosure, and these multiple devices will interact with each other to complete the described method.

An embodiment of the present disclosure also provides a server. The service includes: a communication unit, configured to communicate with a surveillance device; a memory, configured to store a set of instructions; and at least one processor, configured to load and execute the set of instructions to perform the method 400.

Figure 8:
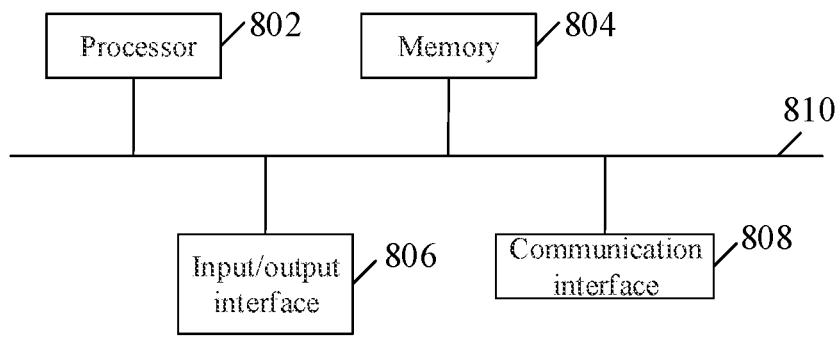
FIG. 8 is a schematic diagram of a hardware structure of a server according to this embodiment.

FIG. 8 shows a schematic diagram of a hardware structure of a server according to an embodiment of the present disclosure. The server 800 may include: a processor 802, a memory 804, an input/output interface 806, a communication interface 808, and a bus 810. The processor 802, the memory 804, the input/output interface 806, and the communication interface 808 realize communication connection between each other in the device via the bus 810.

The processor 802 may be implemented in the form such as a general central processing unit (CPU), a microprocessor, an application specific integrated circuit (ASIC), or one or more integrated circuits, and is configured to perform related programs to implement the technical solutions according to the embodiments of the present disclosure.

The memory 804 may be implemented in the form such as a read-only memory (ROM), a random-access memory (RAM), a static storage device, and a dynamic storage device. The memory 804 may store an operating system and other application programs. Where the technical solutions according to the embodiments of the present disclosure are implemented by software or firmware, related program codes are saved in the memory 804 and called and performed by the processor 802.

The input/output interface 806 is configured to connect an input/output module to realize information input and output. The input/output module may be configured in the device as a component (not shown in the drawings), and may also be externally connected to the device to provide corresponding functions. An input device may include a keyboard, a mouse, a touch screen, a microphone, various sensors, and the like, and an output device may include a display, a speaker, a vibrator, an indicator light, and the like.

The communication interface 808 is configured to connect a communication module (not shown in the drawings) to implement communication interaction between the device and other devices. The communication module may implement communication in a wired fashion (such as a USB and a network cable), or in a wireless fashion (such as a mobile network, Wi-Fi, and Bluetooth).

The bus 810 includes a circuit configured to transmit information between various components of the device (for example, the processor 802, the memory 804, the input/output interface 806, and the communication interface 808).

It should be noted that although only the processor 802, the memory 804, the input/output interface 806, the communication interface 808, and the bus 810 are shown in the above device, in practice, the device may also include other components required for normal operation. In addition, those skilled in the art may understand that the above device may also only include the components necessary to implement the solutions of the embodiments of the present disclosure, with no need to include all the components shown in the drawings.

An embodiment of the present disclosure also provides a surveillance device. The surveillance device includes: a communication unit, configured to communicate with the server and a terminal device, a memory, configured to store a set of instructions; and at least one processor, configured to perform the set of instructions to perform the method 500.

Figure 9:
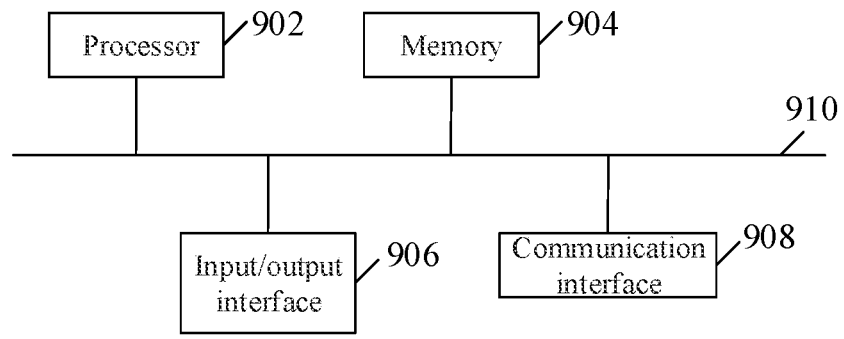
FIG. 9 is a schematic diagram of a hardware structure of a surveillance device according to this embodiment.

FIG. 9 shows a schematic diagram of a hardware structure of a surveillance device 900 according to this embodiment. The surveillance device 900 may include: a processor 902, a memory 904, an input/output interface 906, a communication interface 908, and a bus 910. The processor 902, the memory 904, the input/output interface 906, and the communication interface 908 are communicatively connected to each other in the device via the bus 910.

The processor 902 may be implemented in the form such as a CPU, a microprocessor, an ASIC, and one or more integrated circuits, and is configured to run related programs to perform the technical solutions according to the embodiments of the present disclosure.

The memory 904 may be implemented in the form such as a ROM, a RAM, a static storage device, and a dynamic storage device. The memory 904 may store an operating system and other application programs. Where the technical solutions according to the embodiments of the present disclosure are implemented by software or firmware, related program codes are saved in the memory 904 and called and executed by the processor 902.

The input/output interface 906 is configured to connect an input/output module to realize information input and output. The input/output module may be configured in the device as a component (not shown in the drawings), and may also be externally connected to the device to provide corresponding functions. An input device may include a keyboard, a mouse, a touch screen, a microphone, various sensors, and the like, and an output device may include a display, a speaker, a vibrator, an indicator light, and the like.

The communication interface 908 is configured to be connected to a communication module (not shown in the drawings) to implement communication interaction between the device and other devices. The communication module may implement communication in a wired fashion, such as a USB and a network cable, or in a wireless fashion, such as a mobile network, Wi-Fi, and Bluetooth.

The bus 910 includes a circuit to transmit information between various components of the device, for example, the processor 902, the memory 904, the input/output interface 906, and the communication interface 908.

It should be noted that although only the processor 902, the memory 904, the input/output interface 906, the communication interface 908, and the bus 910 are shown in the above device, in an implementation process, the device may also include other components required for normal operation. In addition, those skilled in the art may understand that the above device may also only include the components necessary to implement the solutions of the embodiments of the present disclosure, with no need to include all the components shown in the drawings.

An embodiment of the present disclosure also provides a terminal device. The terminal device includes: a communication unit for communicating with the surveillance device; a memory for storing a set of instructions; and at least one processor configured to execute the set of instructions to perform the method 600 or the method 700.

Figure 10:
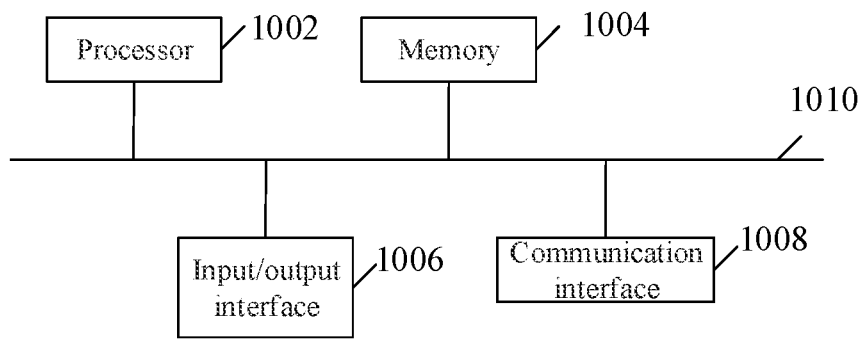
FIG. 10 is a schematic diagram of a hardware structure of a terminal device according to this embodiment.

FIG. 10 shows a schematic diagram of a hardware structure of an electronic device of a terminal device according to this embodiment. The terminal device 1000 may include: a processor 1002, a memory 1004, an input/output interface 1006, a communication interface 1008, and a bus 1010. The processor 1002, the memory 1004, the input/output interface 1006, and the communication interface 1008 realize communication connection between each other in the device via the bus 1010.

The processor 1002 may be implemented in the form such as a CPU, a microprocessor, an ASIC, and one or more integrated circuits, and is configured to perform related programs to implement the technical solutions according to the embodiments of the present disclosure.

The memory 1004 may be implemented in the form such as a ROM, a RAM, a static storage device, and a dynamic storage device. The memory 904 may store an operating system and other application programs. Where the technical solutions according to the embodiments of the present disclosure are implemented by software or firmware, related program codes are saved in the memory 1004 and called and performed by the processor 1002.

The input/output interface 1006 is configured to connect an input/output module to realize information input and output. The input/output module may be configured in the device as a component (not shown in the drawings), and may also be externally connected to the device to provide corresponding functions. An input device may include a keyboard, a mouse, a touch screen, a microphone, various sensors, and the like, and an output device may include a display, a speaker, a vibrator, an indicator light, and the like.

The communication interface 1008 is configured to connect a communication module (not shown in the drawings) to implement communication interaction between the device and other devices. The communication module may implement communication in a wired fashion (such as a USB and a network cable), or in a wireless fashion (such as a mobile network, Wi-Fi. and Bluetooth).

The bus 1010 includes a circuit to transmit information between various components of the device (for example, the processor 1002, the memory 1004, the input/output interface 1006, and the communication interface 1008).

It should be noted that although only the processor 1002, the memory 1004, the input/output interface 1006, the communication interface 1008, and the bus 1010 are shown in the above device, in an implementation process, the device may also include other components required for normal operation. In addition, those skilled in the art may understand that the above device may also only include the components necessary to implement the solutions of the embodiments of the present disclosure, with no need to include all the components shown in the drawings.

Described above are specific embodiments of the present disclosure. Other embodiments are within the scope of appended claims. In some cases, actions or steps described in the claims may be performed in a different order than in the embodiments and still achieve desired results. In addition, the processes depicted in the accompanying drawings do not necessarily require the shown specific order or sequential order in order to achieve the desired results. In some embodiments, multitasking and parallel processing are also possible or may be advantageous.

Those ordinary skilled in the art should understand: the discussion of any of the above embodiments is only exemplary, and is not intended to imply that the scope of the present disclosure (including the claims) is limited to these examples; under the thought of the present disclosure, the above embodiments or technical features in different embodiments may also be combined, the steps may be implemented in any order, and there are many other changes in different aspects of the present disclosure as described above, which are not provided in details for the sake of brevity.

In addition, in order to simplify the description and discussion, and in order not to make the present disclosure difficult to understand, the provided accompanying drawings may or may not show well-known power supply/ground connections with integrated circuit (IC) chips and other components. In addition, apparatuses may be shown in the form of block diagrams in order to avoid difficult understanding to the present disclosure, which also takes into account the fact that the details of implementations of the apparatuses in these block diagrams are highly dependent on a platform on which the present disclosure will be implemented (that is, these details should be fully within an understanding scope of those skilled in the art). In the case that details (for example, circuits) are set forth to describe exemplary embodiments of the present disclosure, it is obvious for those skilled in the art that the present disclosure may be implemented without these details or with these details changed. Therefore, these descriptions should be considered illustrative rather than restrictive.

Although the present disclosure has been described in combination with the embodiments of the present disclosure, many substitutions, modifications and variations of these embodiments will be apparent to those ordinary skilled in the art based on the foregoing description. For example, other memory architectures, for example, a dynamic RAM (DRAM), may use the discussed embodiments.

The present disclosure is intended to cover all such substitutions, modifications and variations that fall within a broad scope of the appended claims. Therefore, within the spirit and principles of the present disclosure, any omissions, modifications, equivalent substitutions, improvements, and the like are within the protection scope of the present disclosure.

What is claimed is:

1. A method for upgrading an Internet of Things (IoT) terminal device, applicable to a server, the method comprising:
    determining a surveillance device and performing two-way verification with the surveillance device;
    sending, in response to successful two-way verification, a first upgrade instruction to at least one of the surveillance device and a terminal device, wherein the server communicates with the terminal device via the surveillance device, and the first upgrade instruction comprises an encrypted upgrade file, encrypted server identification information, and an encrypted first check value;
    wherein determining the surveillance device and performing the two-way verification with the surveillance device comprises:
    determining that the surveillance device is a terminal device or a gateway device in an IoT system;
    in response to the determination that the surveillance device is a terminal device in an IoT system,
    sending a third upgrade instruction and an election instruction to at least two terminal devices in at least one local area network, wherein the third upgrade instruction includes the encrypted server identification information, and the election instruction is configured to elect the surveillance device from the at least two terminal devices in the at least one local area network;
    receiving third confirmation information from a first terminal device, and receiving fourth confirmation information of at least one second terminal device in the at least one local area network, wherein the third confirmation information comprises encrypted terminal device identification information of the first terminal device, the fourth confirmation information comprises the encrypted terminal device identification information of the first terminal device received by the at least one second terminal device, the first terminal device is a terminal device that is elected as the surveillance device, and the second terminal device is a non-surveillance device;

decrypting the third confirmation information and the fourth confirmation information, and comparing the terminal device identification information in the third confirmation information and the terminal device identification information in the fourth confirmation information; and determining, in response to successful verification of the terminal device identification information, the first terminal device as the surveillance device.

2. The method according to claim 1, wherein performing the two-way verification with the surveillance device comprises:

in response to determining that the surveillance device is a gateway device in an IoT system, sending a second upgrade instruction to the surveillance device, wherein the second upgrade instruction comprises the encrypted server identification information;

receiving first confirmation information from the surveillance device, wherein the first confirmation information comprises encrypted surveillance device identification information; and decrypting the first confirmation information and verifying the surveillance device identification information.

3. The method according to claim 2, further comprising:

receiving second confirmation information from the surveillance device, wherein the second confirmation information comprises the encrypted surveillance device identification information and terminal device identification information returned by the terminal device and a second check value returned by the terminal device;

comparing the first check value with the second check value; and sending, in response to verifying that the first check value and the second check value are consistent, first upgrade completion confirmation information to the surveillance device.

4. The method according to claim 3, further comprising:

recording, in response to verifying that the first check value and the second check value are inconsistent, the terminal device identification information of the terminal device with the second check value inconsistent with the first check value, and outputting first warning information.

5. The method according to claim 1, wherein sending the first upgrade instruction to the surveillance device comprises:

sending, using an over-the-air technology, the first upgrade instruction to the surveillance device successful in the two-way verification in a multicast form.

6. A server, comprising: a communication unit, configured to communicate with a surveillance device; a memory, storing a set of instructions; and at least one processor, configured to load and execute the set of instructions to perform the method as defined in claim 1.

7. An Internet of Things (IoT) system comprising:
the server as defined in claim 6;
at least one surveillance device; and
at least one terminal device;

wherein the server communicates with the terminal device via the surveillance device;

the surveillance device is configured to perform two-way verification with the server; receive, in response to successful two-way verification, a first upgrade instruction from the server, wherein the first upgrade instruction comprises an encrypted upgrade file, encrypted server identification information and an encrypted first check value; decrypt the first upgrade instruction and verify the server identification information; and send, in response to successful verification of the server identification information and the surveillance device being a gateway device in the IoT system, a fourth upgrade instruction to the terminal device in a local area network to which the surveillance device belongs, wherein the fourth upgrade instruction comprises the encrypted upgrade file, the encrypted server identification information, the encrypted surveillance device identification information, and the encrypted first check value; and the terminal device is configured to receive the first upgrade instruction from the server or the fourth upgrade instruction from the surveillance device, wherein the first upgrade instruction comprises the encrypted upgrade file, the encrypted server identification information, and the encrypted first check value, and the fourth upgrade instruction comprises the encrypted upgrade file, the encrypted server identification information, the encrypted surveillance device identification information, and the encrypted first check value; decrypt the first upgrade instruction or the fourth upgrade instruction and verify identification information, wherein in the first upgrade instruction, the identification information includes the server identification information, and in the fourth upgrade instruction, the identification information comprises the server identification information and the surveillance device identification information; calculate, in response to successful verification of the identification information, a second check value and compare the first check value with the second check value; and upgrade based on the upgrade file in response to verifying that the first check value and the second check value are consistent.

8. A method for upgrading an Internet of Things (IoT) terminal device, applicable to the terminal device, the method comprising:

receiving a first upgrade instruction from a server or a fourth upgrade instruction from a surveillance device, wherein the first upgrade instruction comprises an encrypted upgrade file, encrypted server identification information, and an encrypted first check value, and the fourth upgrade instruction comprises the encrypted upgrade file, the encrypted server identification information, encrypted surveillance device identification information, and the encrypted first check value;

decrypting the first upgrade instruction or the fourth upgrade instruction and verifying identification information, wherein in the first upgrade instruction, the identification information comprises the server identification information, and in the fourth upgrade instruction, the identification information comprises the server identification information and the surveillance device identification information;

calculating, in response to successful verification of the identification information, a second check value and comparing the first check value with the second check value; and upgrading based on the upgrade file in response to that the first check value and the second check value are verified to be consistent;

receiving a third upgrade instruction and an election instruction from the server, wherein the third upgrade instruction comprises encrypted server identification information;

broadcasting first election information to other terminal devices in a local area network, and receiving second election information broadcast by other terminal devices in the local area network;

comparing the first election information with the second election information;

sending, in response to the first election information being greater than the second election information, third confirmation information for election to be the surveillance device to the server, wherein the third confirmation information comprises encrypted terminal device identification information;

sending, in response to the first election information being less than the second election information, fourth confirmation information for election of other terminal devices to be the surveillance device to the server, wherein the fourth confirmation information comprises encrypted and received terminal device identification information of a first terminal device, and the first terminal device is a terminal device elected to be the surveillance device; and randomly changing, in response to the first election information being equal to the second election information, the first election information and broadcasting the changed first election information again.

9. The method according to claim 8, further comprising:
returning fifth confirmation information to the surveillance device, wherein the fifth confirmation information includes encrypted terminal device identification information and the second check value.

10. The method according to claim 9, wherein in response to verifying that the first check value and the second check value consistent, the method further comprises:
determining whether second upgrade completion confirmation information is received from the surveillance device;

performing upgrade based on the upgrade file in response to determining that the second upgrade completion confirmation information is received; and performing no upgrade in response to determining that the second upgrade completion confirmation information is not received.

11. A terminal device, comprising: a communication unit, configured to communicate with a surveillance device; a memory, storing a set of instructions; and at least one processor, configured to load and execute the set of instructions to perform the method as defined in claim 8.

* * * * *